UNITED STATES PATENT OFFICE.

FLETCHER B. HOLMES, OF WOODBURY, NEW JERSEY, ASSIGNOR TO THE E. I. DU PONT DE NEMOURS POWDER COMPANY, OF WILMINGTON, DELAWARE, A CORPORATION OF NEW JERSEY.

STABILIZED NITRATED STARCH.

No. 875,914.      Specification of Letters Patent.      Patented Jan. 7, 1908.

Application filed May 7, 1907. Serial No. 372,417.

*To all whom it may concern:*

Be it known that I, FLETCHER B. HOLMES, a citizen of the United States, residing at Woodbury, county of Gloucester, and State of New Jersey, have invented a new and useful Improvement in Stabilized Nitrated Starch, of which the following is a full, clear, and exact description.

The object of my invention is to produce stable nitrated starch.

Nitrated starch may be used as an explosive itself, or preferably may be used as a component part of an explosive, such as where it is mixed with sodium nitrate, potassium nitrate, or some other oxygen carrier, with or without the addition of other ingredients. The difficulty with nitrated starch is that it is very unstable, being liable to decomposition. When such nitrated starch decomposes, which it is liable to do at ordinary temperatures, it becomes liable to spontaneous combustion.

I have discovered that I can produce a stable nitrated starch by mixing with nitrated starch an ammonium salt of an oxygen acid of arsenic. The mixing may be in any manner to produce a good mixture. They may be mixed wet or dry and in any kind of a mixer. Preferably, I mix the two in a finely divided powdered condition in a bowl provided with stirrers or paddles. I prefer to use an arsenate of ammonia. As an example of the carrying out of my method and the production of a stable nitrated starch thereby, the following is an example of the manner in which the same may be carried out and the manner in which I have carried it out. With nitrated starch produced in the ordinary manner, I mix three percent. of ammonium arsenate $(NH_4)_3AsO_4$.

The above is an example, and I do not intend to limit myself to this amount as the amount may be increased above or decreased below said percentage and good results be obtained. Other ammonium salts of an oxygen acid of arsenic other than the one named may also be used.

I intend to include and cover in the claims nitrated starch stabilized by the addition of the reagent herein set out whether the same be used as an explosive mixed with other ingredients, or used alone as an explosive.

Having now fully described my invention, what I claim and desire to protect by Letters Patent is:

1. A stable explosive consisting of nitrated starch mixed with an ammonium salt of an oxygen acid of arsenic, the latter being in such proportion as to stabilize the nitrated starch.

2. A stable explosive consisting of nitrated starch mixed with three per cent. of an ammonium salt of an oxygen acid of arsenic.

3. A stable explosive consisting of nitrated starch mixed with an arsenate of ammonia, the latter being in such proportion as to stabilize the nitrated starch.

4. A stable explosive consisting of nitrated starch mixed with three per cent. of an arsenate of ammonia.

In testimony of which invention, I have hereunto set my hand, at Woodbury, N. J., on this 29th day of April, 1907.

FLETCHER B. HOLMES.

Witnesses:
    J. FRANK WILSON, Jr.,
    GEORGE E. PIERSON.